United States Patent [19]
Bendall

[11] 3,880,014
[45] Apr. 29, 1975

[54] DRIVE CHAIN
[76] Inventor: Wilfrid H. Bendall, 12 Castle Hill Rd., Pawcatuck, Conn. 02891
[22] Filed: Aug. 5, 1974
[21] Appl. No.: 494,738

[52] U.S. Cl............. 74/245 R; 74/245 P; 74/249; 74/252; 74/253 R; 59/78
[51] Int. Cl............................................. F16g 13/02
[58] Field of Search...... 74/245 R, 245 P, 249, 252, 74/253 R, 229; 59/78, 90, 35 CP, 80

[56] References Cited
UNITED STATES PATENTS

| | | | |
|---|---|---|---|
| 214,735 | 4/1879 | Wheeler | 74/249 |
| 2,530,014 | 11/1950 | Holmes | 74/249 |
| 2,551,578 | 5/1951 | Bendall | 74/229 |
| 2,770,143 | 11/1956 | Bendall | 74/245 |
| 2,770,144 | 11/1956 | Bendall | 74/245 |
| 2,836,984 | 6/1958 | Bendall | 74/245 |
| 3,555,918 | 1/1971 | Bendall | 74/252 |

Primary Examiner—Samuel Scott
Assistant Examiner—Allan R. Burke

[57] ABSTRACT

A drive chain for transmitting power between toothed sprockets. Identical one-piece link members have integral sprocket engagement and interconnection portions maintaining the link members in separable assembly. The link design is particularly adapted to precise fabrication using injection molded plastic, sintered powder metal and diecasting processes.

5 Claims, 5 Drawing Figures

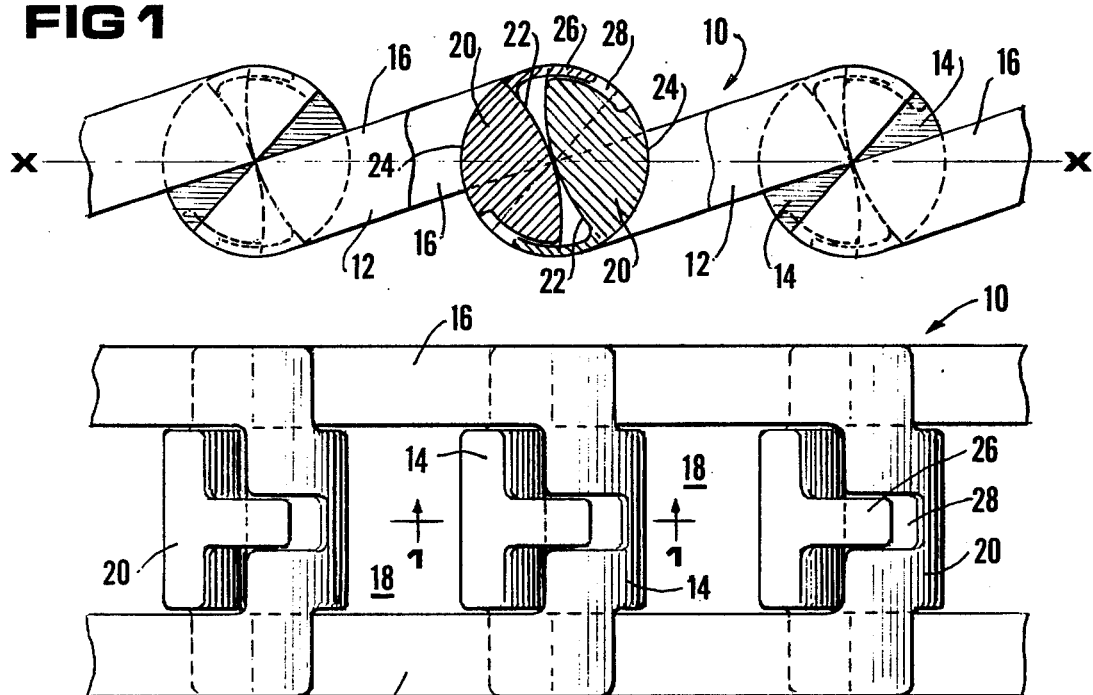
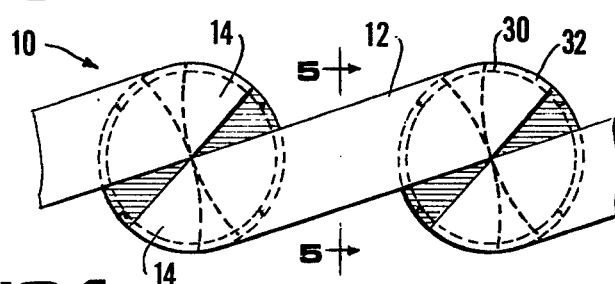
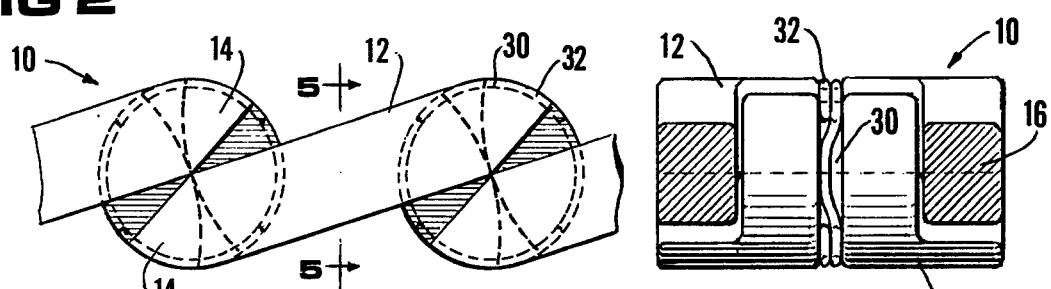
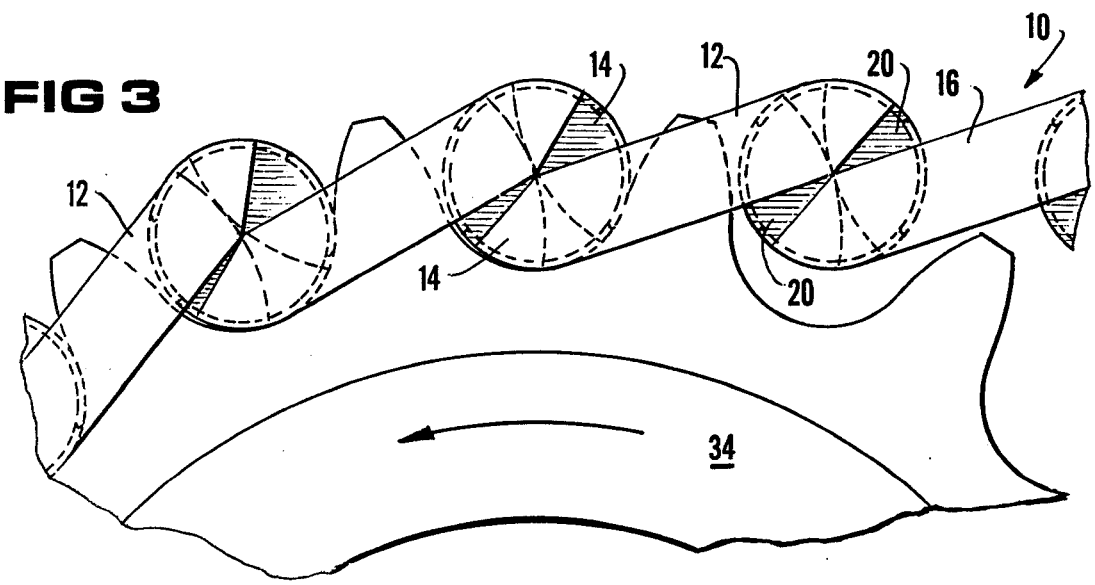

DRIVE CHAIN

BACKGROUND OF THE INVENTION

This invention relates generally to detachable link chains for power transmission purposes employing one-piece interlocking link members which assemble manually, or can be assembled automatically, to form drive chains of any required length and which usually are separable for convenient installation and replacement in the field. Such chains, invented over eighty years ago and still in use today broadly unchanged in design, undoubtedly embody in principle the drive chain of ultimate simplicity and lowest cost. Implicit, however, in the typical prior art designs using stamped or cast link members, is an inherent unsuitability for efficient operation over the wider transmission power and speed ranges subsequently pre-empted by the later developed roller and silent chains, better adapted to precise manufacture. The prior art designs of the present class thus have remained largely restricted to low speed, light load conveyor and farm implement service using cast tooth sprockets.

THE INVENTION

More particularly then, and as its primary object, this invention provides an improved drive chain of the class referred to better adapted to economical and precise fabricating methods and better able to operate efficiently over a wider power transmission and linear speed range than heretofore practicable with such chain.

Another object is to provide link members for a drive chain of this class having a rocking bearing contact between the link members when engaging drive sprockets, to reduce friction and eliminate critical lubrication requirements.

A further object is to provide link members for such chain permitting an assembled chain length to comprise either an odd or an even number of links, obviating the requirement for special interconnecting links.

Another object is to provide a drive chain of this class adapted for operation on the industrially standardized and widely available roller chain drive sprockets.

THE DRAWINGS

FIG. 1 is a partly sectioned view in side elevation of the drive chain of this invention with a sectioned portion on the line 1—1 of FIG. 2.

FIG. 2 is a plan view of the drive chain of FIG. 1.

FIG. 3 is a side elevational view showing the drive chain of this invention engaging a drive sprocket of the industrially standardized roller chain sprocket type.

FIG. 4 is a side elevation view of the chain showing a modified method of retaining the link alignment.

FIG. 5 is a sectional view of the chain of FIG. 4 on the line 5—5 of FIG. 4.

DETAILED DESCRIPTION

Referring to the drawings, FIGS. 1 and 2 illustrate in side elevation and plan views, respectively, an assembled drive chain 10 of the present invention. Identical link members 12 are arranged end to end with overlapping and interconnected end portions 14. Each link member has side bar portions 16 extending on each side of an aperture 18 between the end portions. End portions 14 are of substantially semi-cylindrical form, as shown, with projecting portions 20 intersecting an aperture of an adjacently aligned link member, each portion 20 comprising an arcuate bearing surface 22 at the inner end of the aperture in rocking bearing contact with a like portion of an adjacent link and an outer end surface 24 shaped to engage drive sprocket teeth. End portions 14 further comprise an integral tab extension 26 at an outer end of the projecting link portion 20 and a grooved recess 28 at the inner end thereof, the tab extension being adapted to resiliently engage the groove during assembly as each end portion of a link intersects an aperture of an adjacent link member. The tab and groove feature thus described provides the desirable light endwise restraint and alignment of the link members on assembly while retaining the desired ease of installation and disassembly.

Reverting to the side elevational view in FIG. 1 it will be seen that the opposite end portions 14 of the link members project on opposite sides of an imaginary line, designated $x-x$. This arrangement of the end portions is preferred as permitting a given assembled chain length to comprise either an odd or an even total number of links, providing greater convenience in fitting a chain to a given drive sprocket center distance. It is to be understood that the link members may alternatively be made with the end portions projecting equally on one side of the assumed center line.

FIGS. 4 and 5 show a modified form of the chain of this invention in which the semi-cylindrical link end portions are provided with an annular groove 30 colinear with similarly grooved end portions of adjacently aligned link members. Removable spring wire clips 32 are inserted in the grooves to hold the adjacent link end portions together with the desirable light endwise restraint and alignment of the assembly.

FIG. 3 shows the modified drive chain of FIGS. 4 and 5 mounted on and engaging a drive sprocket 34 of the industrially standardized roller chain sprocket type which, as is generally known, are the drive sprocket type in widest use and availability. It will be observed that the chain links seat into engagement between the sprocket teeth with a relative motion only at the rocking contact of the link interconnecting bearing surfaces 22,22. The chain operation is thus comparatively frictionless and the chain can operate efficiently with little or no lubrication.

The mechanically simple design and the favorable operating characteristics of the chain of this invention thus disclosed justify dimensionally precise manufacture in a wide variety of materials utilizing injection molded plastics, sintered powder metals and die casting processes. While the end portions of the link members are shown and described substantially as of semi-cylindrical form, it will be understood that they may be modified in shape to conform to other bearing contours and sprocket tooth forms, such modifications being properly within the scope of this invention as defined in the following claims.

What is claimed is:

1. A drive chain having apertured link members arranged end to end with overlapping interconnected end portions, said link members having side bar portions extending on each side of an aperture between interconnecting end portions of substantially semi-cylindrical form, each of said end portions having a portion thereof intersecting an aperture of an adjacently aligned link member, said portion thereof comprising a link interconnection bearng surface at each inner end of an aperture and a drive sprocket engaging surface at each outer end of a link and having the bearing surface in articulating contact with a like bearing surface of adjacently aligned link members, each of said end portions further comprising an arcuate groove and resilient means engaging a groove of an adjacent link member and maintaining said members in elastically separable end to end alignment.

2. The drive chain of claim 1, wherein said link end portions further comprise integral extensions thereof engaging a groove of an adjacently aligned link member.

3. The drive chain of claim 1, wherein said bearing surface is substantially arcuate in form and adapted for rocking contact with a like bearing surface of an interconnected link member.

4. The drive chain of claim 1, wherein said intersecting end portions at opposite ends of the link members project on opposite sides of a line through said articulating contact.

5. The drive chain of claim 1, wherein said drive sprocket engaging surface is shaped to engage drive sprockets having teeth of industrially standardized roller chain sprocket tooth form.

* * * * *